Sept. 6, 1960   E. F. BUSHMAN   2,951,780
METHODS OF MAKING DECORATIVE GLASS FIBER
REINFORCED RESIN BODIES
Filed Oct. 19, 1955

REINFORCING
STRUCTURE
10

GLASS FIBER
11

COATING
12
{ SIZING AGENT
BINDER
LUBRICANT
COLORING AGENT }

GLASS FIBER 11

{ COPOLYMERS
COLORING AGENT }

MOLDED
ARTICLE
20

RESIN
23
{ POLYMERS
COLORING SUBSTANCE }

INVENTOR.
Edwin F. Bushman
BY
Smith, Olsen, Baird & Miller,
Attys.

United States Patent Office 2,951,780
Patented Sept. 6, 1960

2,951,780

METHODS OF MAKING DECORATIVE GLASS FIBER REINFORCED RESIN BODIES

Edwin F. Bushman, South Laguna, Calif., assignor to General American Transportation Corporation, Chicago, Ill., a corporation of New York Filed Oct. 19, 1955, Ser. No. 541,535

7 Claims. (Cl. 154—75)

The present invention relates to methods of making decorative glass fiber reinforced resin bodies, particularly sheet laminates, and the like.

In a great variety of commercial articles (luggage, counter tops, containers, etc.) glass fiber reinforced resins are employed due to simplicity and economy of manufacture and to the great structural strength of the resulting plastic bodies, sheets, laminates, etc. In these articles, the designer may desire to emphasize or to de-emphasize the glass fibers that are normally visible at the outer surfaces of the laminates by corresponding color controls. Specifically, the glass fibers that are normally employed in the fabrication of these laminates have a light-gray to milk-white color, since the metal of the glass used is ordinarily aluminum boro-silicate; whereby the glass fibers at the outer surfaces of the laminates are visible in the light-gray to milk-white color against the various background colors of the resins utilized. In order to emphasize or reveal these fibers, it is desirable to impart a fast color thereto that is in sharp contrast with that of the background resin; whereas, in order to de-emphasize or conceal these fibers, it is desirable to impart a fast color thereto that is substantially the same as that of the background resin. While the coloring of these fibers to reveal them or to conceal them is largely a matter of artistic taste or style on the part of the designer, the considerations involved in making the laminates in the two cases are substantially identical.

While the statement of the problem of the color control in these laminates is indeed simple, the practical considerations involved are extremely complex fundamentally for the reason that it is altogether impractical actually to color the metal of the glass fibers since such a process would require the laminator to carry a vast stock of glass fiber reinforcements in a great variety of colors and hues, aside from the complication involved in the manufacture of glass fibers in a wide variety of colors, hues, sizes, etc. Accordingly, any practical process of color control must embrace a coloring step with respect to conventional glass fibers of the normal light-gray to milk-white color. This limitation in a practical process of color control, imposes another difficulty in that modern laminating practice absolutely requires the utilization of glass fibers coated with a sizing agent characterized by both bonding to glass and copolymerization with primary monomers in the resin; whereby the coloring step mentioned, in fact, involves coloring of these copolymers and this reacted interface or layer disposed between the glass of the fibers and the polymers of the resin.

The prior literature relating to the coloring of glass fibers is totally worthless to the laminator, since it deals either with the coloring of the actual metal of the glass fibers or with the coloring of raw glass, and neither of these considerations are in any way pertinent to the problem of the laminator, as he desires to color the reacted interface or layer of sizing agent, as previously noted.

Accordingly, it is a general object of the present invention to provide an improved method of making a decorative glass fiber reinforced resin body, involving glass fibers coated with a sizing agent characterized both by bonding to the glass fibers and by copolymerization with the primary monomers in the molding material, whereby a desired color control may be obtained between that of the reacted interface or layer mentioned and that of the principal body of the resin, so that the glass fibers visible at the surface of the plastic body may be emphasized or revealed, or may be de-emphasized or concealed, as desired, in order that predetermined color effects may be readily produced in the plastic body.

Another object of the invention is to provide a process of the character described, wherein the coloring agents employed are fast, and subject to no substantial bleeding from the reacted interface of the sizing agent into the resin during curing, since they are entirely compatible with and insoluble in the primary monomers in the molding material, the unsaturated resinous monomers and polymers produced in the resin and the oxidizing and catalyzing agents employed in the polymerization reactions, and altogether inert to the molding temperatures utilized.

A further object of the invention is to provide an improved process of the character described that may be readily carried out in an economical and simple manner by a fabricator in the production of a wide variety of plastic bodies, sheets, laminates, etc., and involving a great variety of color controls employing any desired colors, shades and hues.

A further object of the invention is to provide an improved process of the character described that imposes no limitation upon the fabricator with respect to his source of manufactured glass fibers or to his particular process of utilizing the glass fiber reinforcing structures in the form of glass cloth, mats, preforms, etc.

A still further object of the invention is to provide an improved process of the character described that may be employed in combination with a wide variety of molding materials employed in the production of polyester resins, phenol-formaldehyde resins, melamineformaldehyde resins, acryloid resins, epoxy resins and other similar resins.

Further features of the invention pertain to the particular arrangement of the steps of the method and to the composition of the ingredients employed therein, whereby the above-outlined and additional operating features thereof are attained.

The invention, both as to its organization and method of operation, together with further objects and advantages thereof, will best be understood by reference to the following specification taken in connection with the accompanying drawing, in which.

Figure 1:
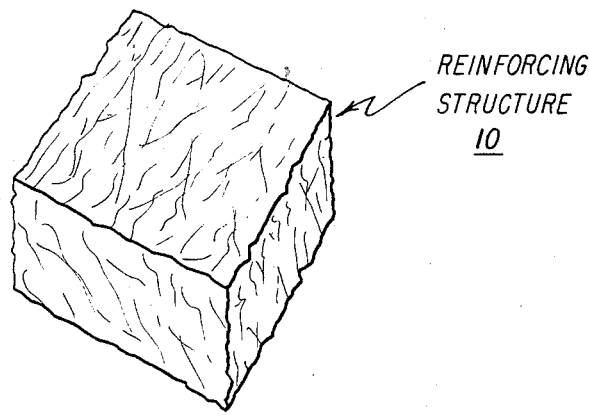
Figure 1 is a fragmentary perspective view of a reinforcing structure employed in the present method.

In accordance with a conventional method, glass fibers of a metal of aluminum boro-silicate are drawn from a bushing in the bottom of either a small marble-fed tank or a large batch tank, at a temperature usually of about 2300° F., and at filament velocities of about 4,000–10,000 feet per minute, usually in groups of 204 filaments; the filaments are sprayed with water a foot or so below the hot bushing and then passed over a wet roller or bed where a suitable emulsion coating is applied to the cool filaments. Several feet below the emulsion coating roller, the fibers are wound-up to produce a forming package that is subjected to suitable heating in order to effect drying of the emulsion coating. After drying, the forming packages are ordinarily wound together into a multiple wound roving package, a roving comprising a group of filaments wound-up together into a roving package, and a roving package comprising a convenient bundle for handling and shipping.

The coating emulsion fundamentally comprises a mixture of a glass sizing agent, a glass binder and a glass lubricant. The glass sizing agent is characterized both by linkage to the glass ingredients and by subsequent copolymerization with the primary monomers in the molding material, as described more fully hereinafter; the glass binder serves to retain together the fibers in the roving and reduces abrasion therebetween in handling, and conventionally comprises polyvinyl acetate; and the glass lubricant prevents subsequent sticking of the glass fibers to mold parts, and conventionally comprises dibutylphthalate.

As noted above, the glass sizing agent is characterized both by linkage to the ingredients of the glass and by subsequent copolymerization with the primary monomers in the molding material and essentially comprises a compound selected from the class consisting of methacrylato chromic chlorides and alkenylsilanes.

Specifically, one suitable methacrylato chromic chloride is sold by E. I. du Pont de Nemours and Company under the name "Volan" and has the general formula:

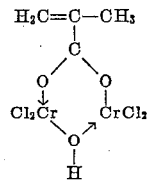

Incident to drying of this coating upon the glass fibers Cr—O—Si linkages are formed at the interface to provide a tenacious bonding therebetween; and subsequently in the curing of the resin the unsaturated hydrocarbon radical

is opened and reacted with the primary monomers in the molding material to provide a tenacious bonding to the polymers produced in the resulting resin. Accordingly, this sizing agent produces intimate bonding of glass fibers to the resin effecting a great increase in the structural strength in the finished laminate.

Specifically, at least two suitable alkenylsilanes are sold by the Linde Air Products Company (a division of Union Carbide & Carbon Corporation); one as vinyltrichlorosilane and having the general formula:

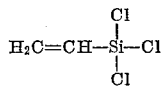

and the other as vinyltriethoxysilane and having the general formula:

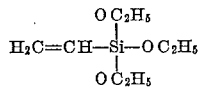

Incident to drying of these coatings upon the glass fibers Si—O linkages are formed at the interface to provide tenacious bonding therebetween; and subsequently in the curing of the resin the unsaturated hydrocarbon radical

is opened and reacted with the primary monomers in the molding material to provide a tenacious bonding to the polymers produced in the resulting resin. Accordingly, these two sizing agents produce intimate bonding of glass fibers to the resin effecting a great increase in the structural strength of the finished laminate.

The methacrylato chromic chloride sizing agent mentioned is water-soluble and may be readily applied to the glass fibers from an aqueous emulsion; whereas the two alkenylsilanes mentioned, as initially introduced into the market were soluble only in neutral hydrocarbons, although more recently such compounds have been introduced into the market by Linde Air Products Company and by others that are either water-soluble or capable of forming suspensions in water so that they may now be applied as coatings to glass fibers from water emulsions. For example, Libby-Owens-Ford Glass Company sells under the trademark "Garan" a product consisting essentially of vinyltrichlorosilane that may be readily dissolved or suspended in water for the purpose of producing a water emulsion that may be employed in coating glass fibers.

The mechanisms of the three sizing agents described above, are fundamentally the same with reference to the production of increased structural strength in the finished laminate, particularly in the presence of moisture, and there is no particular preference of one of these sizing agents over the others for the present purpose; and moreover, a wide variety of molding material may be employed in the production of polyester resins, phenol-formaldehyde resins, melamine-formaldehyde resins, acryloid resins, epoxy resins, and other similar resins, in the resulting laminates.

Specifically, unsaturated polyester resins are very satisfactory in carrying out the present method; which resins comprise the reaction products of molding materials essentially including a first compound selected from the class consisting of polybasic carboxylic acids and anhydrides thereof, and a second compound selected from the class consisting of polyhydric alcohols, wherein at least one of the first and second compounds contains an unsaturated hydrocarbon radical; whereby during curing the ethylenic or olefin groups are cross-linked to form three dimensional structures on polymerization. Also the olefin groups are copolymerized with the unsaturated hydrocarbon radical of the sizing agent, as previously explained. Moreover, the commercial forms of these molding materials normally comprise an additional or third compound containing an unsaturated hydrocarbon monomer. Specifically, the polybasic carboxylic acids: maleic, fumaric, itaconic and phthalic are commonly used; the polyhydric alcohols and glycols: allyl alcohols, ethylene glycol and diethylene glycol are commonly used; and the unsaturated hydrocarbon compounds: styrene and cyclopentadiene are commonly used. Thus in the resins produced from these commercial molding materials, in addition to polyesters, there are present copolymers of the sizing agent and copolymers of the added unsaturated hydrocarbon compound, i.e., styrene.

The utilization of these unsaturated polyester resins in industrial molding operations is very advantageous as quick cures can be obtained at low temperatures (180 to 260° F.), in short time intervals, dependent upon wall thickness (5 to 50 seconds) and at low pressures (50 to 900 p.s.i.). The molding materials are conventionally made up in a viscous liquid form; and immediately preceding use an oxidizing agent or catalyst (conventionally benzoyl peroxide, methyl ethyl ketone peroxide, etc.) is added thereto, along with a filler, if desired. Fillers, such as chalk, clay, calcium carbonate, etc., are frequently added for the purpose of imparting desired chemical resistance, reducing cost, etc.

In the utilization of other resins (phenol-formaldehyde, melamine-formaldehyde, acryloid, epoxy, etc.) the mechanisms of these sizing agents are fundamentally the same as described above, with the result that greatly increased strength is achieved in the resulting laminates.

Turning now to the method of the present invention, in accordance with one embodiment thereof, a suitable coloring agent is incorporated in the emulsion coating along with the glass sizing agent, the glass binder and the glass lubricant, as previously explained, whereby the coloring of the glass fibers is, in fact, carried out by coloring the coating that is applied thereto, so that upon drying of the coating, in the manner previously explained, the desired coloring agent is incorporated therein. Thus, in accordance with this embodiment, the desired color is intimately incorporated into the coating applied to the glass fibers and is normally carried out by the manufacturer of the glass fibers, since the glass fibers are normally coated with the mixture of the glass sizing agent, the glass binder and the glass lubricant by the manufacturer; whereby the roving packages thus produced comprise rovings of glass fibers carrying the required coating incorporating the desired coloring agent.

In this case, the colored rovings may be subsequently woven into desired colored reinforcing glass fiber cloth and ultimately supplied to the laminator. Alternatively in this case, the colored rovings may be chopped and matted to provide a porous mat-like reinforcing structure by the laminator. Further, in this case, the colored mat-like reinforcing structures may be treated with additional binder and a suitable molding material in order to provide colored preforms. In any case, the laminator acquires a porous reinforcing structure formed essentially of coated glass fibers, the coating carrying the desired coloring agent, as well as the glass sizing agent, the glass binder and the glass lubricant.

In order to produce a molded plastic article, such, for example, as a laminated sheet, one of the colored reinforcing structures is placed in the mold so that at least one surface thereof is in contact with a surface of the mold; the mold is closed; and the molding material of the character previously described, and also containing a coloring substance, is introduced into the mold and into contact with the reinforcing structure so as to fill the interstices thereof and to embed all of the glass fibers of the reinforcing structure, except those at the one surface thereof in contact with the one surface of the mold. Curing is effected by temperature and pressure in a conventional manner; whereby there is produced a unitary decorative reinforced plastic body.

In the finished laminate, the coloring agent incorporated in the coating carried by the glass fibers is integrated at the interface of the glass fibers; whereas the coloring substance of the molding material is integrated in the finished resin; whereby the glass fibers are colored by the coloring agent mentioned and the resin is colored by the coloring substance mentioned. Accordingly, the glass fibers visible at the one surface of the finished laminate are either emphasized or deemphasized depending upon the contrast or match between the color of the glass fibers and the background color of the resin; whereby the normally visible glass fibers mentioned are either revealed or concealed, as desired.

In accordance with another embodiment of the invention, the glass fibers of the reinforcing structures are supplied to the laminator in their natural or normal coloring (light-gray to milk-white), the glass fibers carrying a coating comprising only the glass sizing agent, the glass binder and the glass lubricant. Again, it is noted that the glass fibers thus supplied may be in the form of finished reinforcing structures or as rovings, in the event the laminator produces his own reinforcing structures; and such structures may be in the form of glass cloth, porous glass mats, porous glass preforms, etc., of an entirely conventional character.

In this case, the laminator colors the glass fiber reinforcing structures, and specifically, the coating mentioned carried thereby, by utilizing a suitable vehicle carrying a suitable coloring agent, and involving spraying, dipping, paintings, etc., of the vehicle with respect to the reinforcing structures, followed by evaporation of the vehicle, so that the residue containing the coloring agent effects coloring of the coating carried by the glass fibers incorporated in the reinforcing structures.

For example, water may normally be used as the vehicle in conjunction with coloring agents that are water-soluble or capable of forming a dispersion in water. After the coloring step, the reinforcing structures are ordinarily placed in an oven and dried at a temperature of about 250° F. for a suitable time interval. Of course, it will be understood that vehicles other than water may be similarly employed in conjunction with corresponding compatible coloring agents.

In order to produce a molded plastic article, such, for example, as a laminated sheet, one of the thus colored reinforcing structures is placed in the mold so that at least one surface thereof is in contact with a surface of the mold; the mold is closed; and the molding material of the character previously described (also containing a coloring substance) is introduced into the mold and into contact with the reinforcing structure so as to fill the interstices thereof and to embed all of the glass fibers of the reinforcing structure, except those at the one surface thereof in contact with the one surface of the mold. Curing is effected by temperature and pressure in a conventional manner; whereby there is produced a unitary decorative reinforced plastic body.

In the finished laminate, the coloring agent incorporated in the coating carried by the glass fibers is integrated at the interface of the glass fibers; whereas the coloring substance of the molding material is integrated in the finished resin; whereby the glass fibers are colored by the coloring agent mentioned and the resin is colored by the coloring substance mentioned. Accordingly, the glass fibers visible at the one surface of the finished laminate are either emphasized or deemphasized depending upon the contrast or match between the color of the glass fibers and the background color of the resin; whereby the normally visible glass fibers mentioned are either revealed or concealed, as desired.

In view of the foregoing explanation of the two fundamental embodiments of the invention, it will be understood that really the only difference therebetween resides in the coloring step. Specifically, in the first embodiment, the coloring and the coating of the glass fibers is carried out simultaneously, or as a combined step, and before the formation of the reinforcing structure; whereas in the second embodiment, the coloring of the glass fibers is carried out as a separate step subsequent to the coating thereof and after the formation of the reinforcing structure. Accordingly, in the first embodiment, the coloring step is normally carried out by the manufacturer of the glass fibers, incident to the production of the coating thereon; whereas in the second embodiment, the coloring step is normally carried out by the laminator just prior to carrying out the molding operation.

While a wide variety of coloring agents may be employed in the present method for the purpose of coloring the coating carried by the glass fibers in the reinforcing structures, such coloring agents (dyes, stains, pigments, etc.) must be compatible with and resistant to the primary monomers in the molding compound, to the unsaturated resinous monomers (styrene, vinyl acetate, etc.) in the resulting resin, to the oxidizing and catalyzing agents (benzoyl peroxide, methyl ethyl ketone peroxide, etc.) employed, and to the molding reaction temperatures in the general ranges 180 to 260° F. (polyesters and epoxies) and 300 to 350° F. (melamines and phenolics). Furthermore, the coloring agents mentioned must be both compatible with and insoluble in all of the ingredients of the resin so that there is no substantial bleeding therefrom from the glass fibers of the reinforcing structures into the resin during the curing step in order that the fibers visible at the corresponding one surface of the resulting plastic body may have a characteristic color as established by the coloring agent, and bearing the desired predetermined relation to the color of the resin, as established by the coloring substance therein;

whereby the normally visible fibers mentioned are concealed or revealed, as desired, at the surface of the finished plastic body. Further, it is apparent that the coloring agents must be compatible with the glass sizing agent that is employed in the coating carried by the glass fibers and specifically with the sizing agent selected from the class consisting of methacrylato chromic chlorides and alkenylsilanes, as previously described. Furthermore, the coloring agent must be color-fast, not only with respect to water and the chemicals previously described, but to light; and such color-fastness should not be subject to variation with age following the formation of the plastic body.

Figure 2:
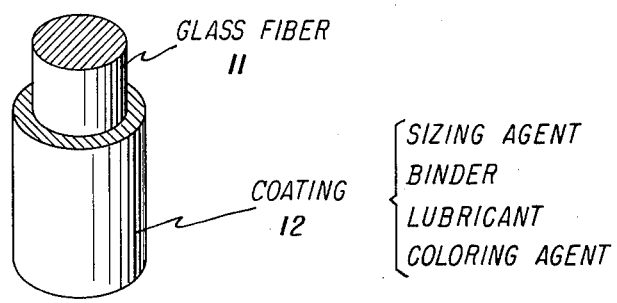
Fig. 2 is a greatly enlarged fragmentary perspective view of a coated glass fiber incorporated in the reinforcing structure of Fig. 1.

Referring to the drawing, the reinforcing structure 10 illustrated in Fig. 1 is of porous construction essentially comprising loosely matted glass fibers 11. Each glass fiber 11 carries an intimate coating 12 comprising a sizing agent, a binder, a lubricant and a coloring agent, as indicated in Fig. 2; whereby the color of the glass fiber 11 is established by the coloring agent incorporated in the coating 12.

Figure 3:
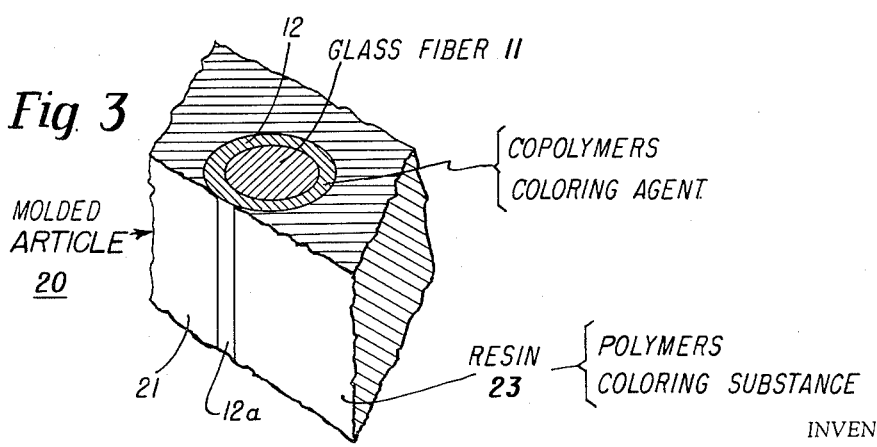
Fig. 3 is a greatly enlarged perspective view of a fragmentary part of a molded article in which the reinforcing structure of Fig. 1 has been incorporated.

Now, as indicated in Fig. 3, the present process is productive of the molded article 20 in which the reinforcing structure 10 is intimately incorporated; whereby the one of the glass fibers 11 there illustrated is disposed adjacent to the exterior surface 21 of the molded article 20 so that a portion 12a of the coating 12 carried by this fiber 11 is visible from the exterior. The initial molding material comprises suitable monomers and a coloring substance; whereby in the molding process, the monomers are productive of polymers in the resin 23, which resin 23 has a color established by the coloring substance noted. Also copolymers are produced in the sizing incorporated in the coating 12 carried by the glass fiber 11; whereby the composite molded article 20 is formed of unitary construction. At the visible molded surface 21 of the article 20, the portion 12a of the coating 12, as well as the principal body of the resin 23, are visible; whereby the glass fiber 11 is concealed or revealed, as desired, depending upon the relationship between the color of the glass fiber 11 and the color of the resin 23. In the arrangement, the color of the glass fiber 11 is established by the coloring agent incorporated in the coating 12, while the color of the resin 23 is established by the coloring substance incorporated in the initial molding material.

*Example I*

Borosilicate glass filament rovings were simultaneously coated and colored at the drawing bushing in the manner previously described, and utilizing a water emulsion comprising a mixture:

(1) Glass sizing agent (methacrylato chromic chloride), about: ½ to 2% by weight.
(2) Glass binder (polyvinyl acetate), about: 2 to 4% by weight.
(3) Glass lubricant (dibutylphthalate), about: 10% by weight.
(4) Coloring agent (American Aniline Co.—Amacid Resorcene Brown 2R), about: 8 grams of dye to each 454 grams of water.

After this coating was applied to the glass filaments, they were dried in a suitable oven at a temperature of about 120 to 180° F. for about 8 hours; and subsequently brown colored roving packages were formed therefrom in a conventional manner.

These brown colored rovings were subsequently loosely felted to produce a brown colored coated glass fiber reinforcing structure that was employed in a conventional molding operation of the character described in the production of a sheet laminate, and utilizing a commercial molding material of the polyester-styrene type (Libby-Owens Ford Glass Co.—"Plaskon" 941) and employing benzoyl peroxide as a catalyst. To the molding material there was added prior to use a suitable quantity of an oil-soluble brown coloring substance (composition not critical) for color control purposes.

In the laminate thus produced, the normally visible glass fibers at the surface thereof were concealed in that they were rendered substantially invisible by virtue of the match between the coloring agent (brown) incorporated therein and the coloring substance (brown) incorporated in the resulting resin; and there was no bleeding of the brown coloring agent from the glass fibers into the brown colored resin.

*Example II*

Borosilicate glass filament rovings were simultaneously coated and colored at the drawing bushing in the manner previously described, and utilizing a water emulsion comprising a mixture:

(1) Glass sizing agent (vinyltrichlorosilane) about: ½% by weight.
(2) Glass binder (polyvinyl acetate), about: 2 to 4% by weight.
(3) Glass lubricant (dibutylphthalate), about: 10% by weight.
(4) Coloring agent (Amacid Resorcene Brown 2R), about: 8 grams of dye to each 454 grams of water.

After this coating was applied to the glass filaments, they were dried in a suitable oven at a temperature of about 120 to 180° F. for about 8 hours; and subsequently brown colored roving packages were formed therefrom in a conventional manner.

These brown colored rovings were subsequently loosely felted to produce a brown colored coated glass fiber reinforcing structure that was employed in a conventional molding operation of the character described in the production of a sheet laminate, and utilizing a commercial molding material of the polyester-styrene type ("Plaskon" 941) and employing benzoyl peroxide as a catalyst. To the molding material there was added prior to use a suitable quantity of an oil-soluble brown coloring substance (composition not critical) for color control purposes.

In the laminate thus produced, the normally visible glass fibers at the surface thereof were concealed in that they were rendered substantially invisible by virtue of the match between the coloring agent (brown) incorporated therein and the coloring substance (brown) incorporated in the resulting resin; and there was no bleeding of the brown coloring agent from the glass fibers into the brown colored resin.

*Example III*

Borosilicate glass filament rovings were coated at the drawing bushing, in the general manner previously described, and utilizing a water emulsion comprising a mixture:

(1) Glass sizing agent (methacrylato chromic chloride), about: ½ to 2% by weight.
(2) Glass binder (polyvinyl acetate), about: 2 to 4% by weight.
(3) Glass lubricant (dibutylphthalate), about: 10% by weight.

After this coating was applied to the glass filaments, they were dried in a suitable oven at a temperature of about 120 to 180° F. for about 8 hours; and subsequently uncolored (light gray to milk-white, natural color) roving packages were formed therefrom in a conventional manner. These uncolored rovings were subsequently loosely felted to produce an uncolored coated glass fiber reinforcing structure that was employed in the molding operation described below in the production of a sheet laminate.

Hereinafter the foregoing description of the procedures for producing uncolored coating roving packages and for subsequently loosely felting the same to produce an uncolored coated glass fiber reinforcing structure are referred to collectively as "the standard method" of making an uncolored coated glass fiber reinforcing structure.

One of the uncolored coated glass fiber reinforcing structures was converted into a preform by impregnation with a small amount of molding material of the polyester-styrene type and then heat-treated to a relatively low temperature to bring about the formation of a small amount of polyester resin in a conventional manner.

Subsequently the preform was sprayed with a water dispersion of a blue dyestuff (Imperial Papers Color Corp.—"Monarch" X2345), the quantity of dyestuff added was sufficient to impart a dark blue color to the coated glass fibers; thereafter the preform was placed in an oven and dried at a temperature of 250° F. for a few minutes in order to evaporate the water vehicle so that the dark blue colored residue effected the desired dark blue color of the preform; whereupon the dark blue colored preform was transferred to storage for subsequent use.

Later the dark blue colored preform was transferred to a mold and saturated with a solid powdered molding material of the melamine-formaldehyde type (Monsanto Chemical Co.—"Resimine" #RB038); thereafter the mold was closed and the molding material was cured at a pressure of about 100 p.s.i. at a temperature of about 300° F. for a short time interval of about 5-minutes. This molding material contained a chalk white coloring substance; whereby the cured resin had a chalk white color.

In the laminate thus produced, the glass fibers visible at the surface thereof were revealed by virtue of the sharp contrast between the color (dark blue) thereof and the color (chalk white) of the resin; which emphasis of the glass fibers was very attractive and of characteristic design; and there was no bleeding of the dark blue coloring agent from the glass fibers into the chalk white colored resin.

*Example IV*

An uncolored coated glass fiber reinforcing structure of porous mat-like form was produced in accordance with the previously-described "standard method"; thereafter the reinforcing structure was sprayed with a water dispersion of a brown dyestuff (Amacid Resorcene Brown 2R), the quantity of dyestuff added was sufficient to impart a dark brown color to the coated glass fibers; thereafter the reinforcing structure was placed in an oven and dried at a temperature of about 120 to 180° F. for about 8 hours in order to evaporate the water vehicle so that the colored residue effected the desired darkbrown color of the reinforcing structure; whereupon the dark brown colored reinforcing structure was transferred to storage for subsequent use.

Later the dark brown colored reinforcing structure was transferred to a mold; the mold was charged with a solid powdered molding material of the phenol-formaldehyde type (Monsanto Chemical Co. — "Resinox" #RI3016); thereafter the mold was closed and the molding material was cured at a pressure of about 100 p. s. i. at a temperature of about 300° F. for a time interval of about 5 minutes. This cured resin contains natural coloring substances causing the resin to have a dark brown color.

In the laminate thus produced, the normally visible glass fibers at the surface thereof were concealed in that they were rendered substantially invisible by virtue of the match between the coloring agent (dark brown) incorporated therein and the normal or natural coloring substances (dark brown) incorporated in the resulting resin; and there was no bleeding of the dark brown coloring agent from the glass fibers into the dark brown colored resin.

*Example V*

An uncolored coated glass fiber reinforcing structure of porous mat-like form was produced in accordance with the previously-described "standard method"; thereafter the reinforcing structure was sprayed with a water dispersion of a red dyestuff (American Cyanamid Co.— "Calcotone" Red B–80% Paste) the quantity of dyestuff added was sufficient to impart a bright red color to the coated glass fibers; thereafter the reinforcing structure was placed in an oven and dried at a temperature of about 120 to 180° F. for about 8 hours in order to evaporate the water vehicle so that the colored residue effected the desired red color of the reinforcing structure; whereupon the bright red colored reinforcing structure was transferred to storage for subsequent use.

A methyl methacrylate sheet was then cast employing 70-parts of monomer (Du Pont #X27C), 30 parts of polymer (Du Pont #40) and benzoyl peroxide as a catalyst (about 0.33% by weight of the monomer). First the monomer and the polymer were thoroughly mixed for about three hours and into the mixture was added a suitable quantity of golden cadmium yellow dyestuff ("Monarch" X2283 Golden Cadmium Yellow); and thereafter the catalyst was added and the molding material cast in a cell and allowed to cure at room temperature for two days; whereupon the resulting methyl methacrylate sheet having a golden cadmium yellow color was removed from the cell and transferred to storage for subsequent use.

Later the bright red colored reinforcing structure was transferred to a mold; the golden cadmium yellow colored methyl methacrylate sheet was then laid upon the top of the reinforcing structure and the mold was closed after being preheated to a temperature of 285° F. The mold remained closed for about 5 minutes and during this time, a pressure of about 700 p.s.i. was exerted on the sheet to effect a cure. Thereafter the resulting laminate was allowed to cool under pressure to a temperature of about 150° F. and subsequently the mold was opened and the laminate was allowed to cool to room temperature.

In the laminate thus produced, the glass fibers visible at the surface thereof were revealed by virtue of the sharp contrast between the bright red color thereof and the golden cadmium yellow color of the resin; which emphasis of the glass fiber was very attractive and of characteristic design; and there was no bleeding of the coloring agent (bright red) from the glass fibers into the golden cadmium yellow colored resin.

*Example VI*

An uncolored coated glass fiber reinforcing structure of porous mat-like form was produced in accordance with the previously-described "standard method"; thereafter the reinforcing structure was sprayed with a water dispersion of a suitable coloring agent (several colors were used, as explained more fully below), the quantity of coloring agent added was sufficient to impart the desired color to the coated glass fibers; thereafter the reinforcing structure was placed in an oven and dried at a temperature of about 120 to 180° F. for about 8 hours in order to evaporate the water vehicle so that the colored residue effected the desired color of the reinforcing structure; whereupon the colored reinforcing structure was transferred to storage for subsequent use.

Later the reinforcing structure was transferred to a mold; the mold was charged with 8 lbs. of molding material in liquid form of the epoxy type (Shell Chemical Co.—"Epon" #828), together with 0.8 lb. of dilutent (glycidylphenol ether), and also 1.8 lbs. of curing agent (2 parts of metaphenylene diamine and 1 part of styrene. To the molding material there was added a suitable quantity of a coloring substance (several colors were used, as explained more fully below). The mold was closed and the molding material was cured at a pressure of about 100 p.s.i. at a temperature of about 300° F. for a time interval of about 3 minutes; and thereafter the mold was opened and the resulting laminate was removed therefrom.

In this example, the coated glass fibers were variably colored, as previously noted:

(1) Dark red, using a suitable quantity of a red dyestuff ("Calcotone" Red B–80% Paste).
(2) Dark blue, using a suitable quantity of a blue dyestuff ("Monarch" X2345).
(3) White, using a suitable quantity of a white pigment ("Calcotone" White T Paste).
(4) Black, using a suitable quantity of a black pigment (Columbia Carbon Co. "Manpico" Black).

In this example, the resin was variably colored, as previously noted:

(1) Without the addition of extraneous pigments, the normal coloring substances in the cured resin imparted a light amber color thereto.
(2) A suitable quantity of an oil-soluble brown coloring substance (composition not critical) was added thereto as to impart a dark chocolate brown color to the cured resin.

Accordingly, in the laminates thus produced, the glass fibers at the surface thereof were revealed by virtue of the sharp contrast between the various colors (dark red, dark blue, white and black) thereof and the two colors (light amber and dark chocolate brown) of the resin; and there was no bleeding of the coloring agent (dark red, dark blue, white or black) from the glass fiber into the light amber or dark chocolate brown colored resin.

In the production of the laminates in accordance with Examples I to V, inclusive, while only one glass fiber color and only one resin color were specifically noted, it is pointed out that laminates have been made in accordance with these examples utilizing a wide variety of colors both in the glass fibers and in the resins; and in general, the colorants have been procured from: American Aniline Co., American Cyanamid Co. and Imperial Papers Color Corp., as previously noted.

While a wide variety of coloring agents may be employed for the purpose of coloring the glass fibers, as previously indicated, the coloring agent selected must be both compatible with and insoluble in the ingredients of the resulting resin so that there is no substantial bleeding of the coloring agent from the glass fibers of the reinforcing structure into the resin in the curing step; and at this point, it is noted that it is well for the laminator to make a trial run in order to check the suitability of a particular coloring agent for the glass fibers in conjunction with a particular resin, as all of the coloring agents that are compatible with and insoluble in the ingredients of one resin may not be so in the ingredients of another resin, with the resulting tendency to bleed from the glass fibers into the other resins during the curing step.

In view of the foregoing, it is apparent that there has been provided an improved method of making decorative glass fiber reinforced resin bodies, whereby the fibers visible at the surface of the resulting body have a characteristic color bearing a predetermined relation to the color of the resin so as to conceal or to reveal, as desired, these visible fibers.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of making a decorative reinforced plastic body comprising the steps: providing a porous reinforcing structure formed essentially of glass fibers coated with a suitable sizing agent selected from the class consisting of methacrylato chromic chlorides and alkenylsilanes, said sizing agent being characterized by the formation of Si—O linkages with the glass fibers and by an unsaturated hydrocarbon radical capable of copolymerization with unsaturated hydrocarbon radicals, said sizing agent containing a suitable coloring agent imparting a characteristic color to the fibers of said structure, providing a molding material containing a first compound selected from the class consisting of polybasic carboxylic acids and anhydrides thereof and a second compound selected from the class consisting of polyhydric alcohols, wherein at least one of said compounds contains an unsaturated hydrocarbon radical, said molding material being characterized by curing in contact with said sizing agent to produce a solid resin containing ingredients including both polymers of said compounds and copolymers of at least one of said compounds and said sizing agent, placing said structure in a mold so that at least one surface thereof is in contact with a surface of said mold, introducing said molding material into said mold and into contact with said structure so as substantially to fill the interstices thereof and to embed all of the fibers of said structure except those at the one surface thereof in contact with the surface of said mold, and curing said molding material to produce a unitary decorative reinforced plastic body, said coloring agent being both compatible with and insoluble in the ingredients of said resin so that there is no substantial bleeding of said coloring agent from the fibers of said structure into said resin in said curing step, whereby the fibers visible at the corresponding one surface of said resulting body have a characteristic color established by said coloring agent and bearing a predetermined relation to the color of said resin.

2. The method set forth in claim 1, wherein the color imparted by said coloring agent to the glass fibers of said body closely matches the color of the resin of said body so that said predetermined color relation is such as to conceal the glass fibers at said one surface of said body.

3. The method set forth in claim 1, wherein the color imparted by said coloring agent to the glass fibers of said body sharply contrasts with the color of the resin of said body so that said predetermined color relation is such as to reveal the glass fibers at said one surface of said body.

4. The method of making a decorative reinforced plastic body comprising the steps: providing a porous reinforcing structure formed essentially of glass fibers coated with a mixture of a suitable glass sizing agent and a suitable glass binding agent and a suitable coloring agent, said glass sizing agent being selected from the class consisting of methacrylato chromic chlorides and alkenylsilanes, said sizing agent being characterized by the formation of Si—O linkages with the glass fibers and by an unsaturated hydrocarbon radical capable of copolymerization with unsaturated hydrocarbon radicals, said glass binding agent retaining together the fibers of said structure and reducing abrasion therebetween in handling of said structure, said coloring agent imparting a characteristic color to the fibers of said structure, providing a molding material containing a coloring substance and a first compound selected from the class consisting of polybasic carboxylic acids and anhydrides thereof and a second compound selected from the class consisting of polyhydric alcohols, wherein at least one of said compounds contains an unsaturated hydrocarbon radical, said molding material being characterized by curing in contact with said sizing agent to produce a colored solid resin containing ingredients including both polyesters and copolymers of at least one of said compounds and said sizing agent, placing said structure in a mold so that at least one surface thereof is in contact with a surface of said mold, introducing said molding material into said mold and into contact with said structure so as substantially to fill the interstices thereof and to embed all of the fibers of said structure except those at the one surface thereof in contact with the surface of said mold, and curing said molding material by heat and pressure to produce a unitary decorative reinforced plastic body, said coloring agent being both compatible with and insoluble in the ingredients of said resin so that there is no substantial bleeding of said coloring agent from the fibers of said structure into said resin in said curing step, whereby the fibers visible at the corresponding one surface of said resulting body have a characteristic color established by said coloring agent and bearing a predetermined relation to the color of said resin.

5. The method of making a decorative reinforced plastic sheet laminate comprising the steps: providing a reinforcing structure in the form of a sheet-like mat of loosely felted glass fibers coated with a suitable sizing agent selected from the class consisting of methacrylato chromic chlorides and alkenylsilanes, said sizing agent being characterized by the formation of Si—O linkages with the glass fibers and by an unsaturated hydrocarbon radical capable of copolymerization with unsaturated hydrocarbon radicals, said sizing agent containing a suitable coloring agent imparting a characteristic color to the fibers of said structure, providing a molding material containing both a coloring substance and a first compound selected from the class consisting of polybasic carboxylic acids and anhydrides thereof and a second compound selected from the class consisting of polyhydric alcohols, wherein at least one of said compounds contains an unsaturated hydrocarbon radical, said molding material being characterized by curing in contact with said sizing agent to produce a colored solid resin containing ingredients including both polyesters and copolymers of at least one of said compounds and said sizing agent, placing said structure in a mold so that at least one surface thereof is in contact with a surface of said mold, introducing said molding material into said mold and into contact with said structure so as substantially to fill the interstices thereof and to embed all of the fibers of said structure except those at the one surface thereof in contact with the surface of said mold, and curing said molding material by heat and pressure to produce a unitary decorative reinforced plastic sheet laminate, said coloring agent being both compatible with and insoluble in the ingredients of said resin so that there is no substantial bleeding of said coloring agent from the fibers of said structure into said resin in said curing step, whereby the fibers visible at the corresponding one surface of said resulting sheet laminate have a characteristic color established by said coloring agent and bearing a predetermined relation to the color of said resin.

6. The method of making a decorative reinforced plastic body comprising the steps: providing glass fibers coated with a suitable sizing agent selected from the class consisting of methacrylato chromic chlorides and alkenylsilanes, said agent being characterized by the formation of Si—O linkages with the glass fibers and by an unsaturated hydrocarbon radical capable of copolymerization with unsaturated hydrocarbon radicals, said sizing agent containing a suitable coloring agent imparting a characteristic color to said fibers, producing from said coated fibers a porous reinforcing structure, providing a molding material containing both a coloring substance and a first compound selected from the class consisting of polybasic carboxylic acids and anhydrides thereof and a second compound selected from the class consisting of polyhydric alcohols, wherein at least one of said compounds contains an unsaturated hydrocarbon radical, said molding material being characterized by curing in contact with said sizing agent to produce a colored solid resin containing ingredients including both polymers of said compounds and copolymers of at least one of said compounds and said sizing agent, placing said glass fibers in a mold so that at least certain ones thereof are in contact with a surface of said mold, introducing said molding material into said mold and into contact with said glass fibers so as to fill the interstices thereof and to embed all of said fibers except those in contact with the surface of said mold, and curing said molding material by heat and pressure to produce a unitary decorative reinforced plastic body, said coloring agent being both compatible with and insoluble in the ingredients of said resin so that there is no substantial bleeding of said coloring agent from the fibers into said resin in said curing step, whereby said fibers visible at the corresponding one surface of said resulting body have a color established by said coloring agent and bearing a predetermined relation to the color of said resin.

7. The method of making a decorative reinforced plastic body comprising the steps: providing a porous reinforcing structure formed essentially of glass fibers coated with a suitable sizing agent selected from the class consisting of methacrylato chromic chlorides and alkenylsilanes, said sizing agent being characterized by the formation of Si—O linkages with the glass fibers and by an unsaturated hydrocarbon radical capable of copolymerization with unsaturated hydrocarbon radicals, providing a liquid vehicle carrying a coloring agent, contacting said structure with said vehicle carrying said coloring agent, evaporating said vehicle from said structure so that said coloring agent in the residue imparts a characteristic color to the fibers of said structure, providing a molding material containing both a coloring substance and a first compound selected from the class consisting of polybasic carboxylic acids and anhydrides thereof and a second compound selected from the class consisting of polyhydric alcohols, wherein at least one of said compounds contains an unsaturated hydrocarbon radical, said molding material being characterized by curing in contact with said sizing agent to produce a colored solid resin containing ingredients including both polymers of said compounds and copolymers of at least one of said compounds and said sizing agent, placing said structure in a mold so that at least one surface thereof is in contact with a surface of said mold, introducing said molding material into said mold and into contact with said structure so as to fill the interstices thereof and to embed all of the fibers of said structure except those at the one surface thereof in contact with the surface of said mold, and curing said molding material by heat and pressure to produce a unitary decorative reinforced plastic body, said coloring agent being both compatible with and insoluble in the ingredients of said resin so that there is no substantial bleeding of said coloring agent from the fibers of said structure into said resin in said curing step, whereby the fibers visible at the corresponding one surface of said resulting body have a characteristic color established by said coloring agent and bearing a predetermined relation to the color of said resin.

References Cited in the file of this patent

UNITED STATES PATENTS

| | | |
|---|---|---|
| 2,378,642 | Kopplin | June 19, 1945 |
| 2,392,805 | Biefeld | Jan. 15, 1946 |
| 2,495,640 | Muskat | Jan. 24, 1950 |
| 2,577,205 | Meyers et al. | Dec. 4, 1951 |
| 2,688,580 | Fingerhut | Sept. 7, 1954 |
| 2,723,215 | Biefeld et al. | Nov. 8, 1955 |
| 2,742,378 | Te Grotenhuis | Apr. 17, 1956 |
| 2,794,760 | Wilson | June 4, 1957 |

FOREIGN PATENTS

| | | |
|---|---|---|
| 630,199 | Great Britain | Oct. 7, 1949 |